INVENTOR.
ADOLF W. LOHMANN
BY Elmer Galliati
ATTORNEY

United States Patent Office 3,421,809

Patented Jan. 14, 1969

3,421,809

APPARATUS FOR EXCEEDING THE CUTOFF FREQUENCY OF A BAND LIMITED OPTICAL SYSTEM

Adolf W. Lohmann, San Jose, Calif., assignor to International Business Machines Corporation, Armonk, N.Y., a corporation of New York Filed Mar. 15, 1965, Ser. No. 439,787

U.S. Cl. 350—162 3 Claims

Int. Cl. G02b *5/18;* G02b *1/00*

ABSTRACT OF THE DISCLOSURE

Objects, which vary mostly in one direction, have a cigar-shaped spatial frequency spectrum. Such an object spectrum is badly matched to the frequency transfer domain of most lens systems, since lens systems usually have a circular transfer domain. By means of spatial modulation, one can adapt the object spectrum to the transfer domain of the lens. Modulation is accomplished by a periodic structure positioned in front of the optical system and demodulation is accomplished by a periodic structure positioned behind the optical system.

The present invention relates to optical systems and more particularly to increasing the resolution of an optical system.

Any optical system only transmits a certain range of spatial frequencies. In general, a higher quality optical system will transmit a greater range of spatial frequencies. The range of frequencies which a particular system will transmit is generally defined as the resolution of the system.

The prior art shows various techniques for increasing the resolution of optical systems. These techniques generally involved the use of mechanically moving elements within the system. One such technique is described in a paper by A. W. Lohmann and D. P. Paris published in Applied Optics, vol. 3, page 1037, September 1964.

An object of the present invention is to provide an optical system which achieves high resolution without using mechanically moving components.

Yet another object of the present invention is to provide an optical system for transmitting one dimensional images which has a high resolution.

Another object of the present invention is to increase the resolution of an optical system when the same is transmitting one dimensional images by more fully utilizing the two dimensional spatial frequency transmission capability of the system.

Another object of the present invention is to transform an image so that one dimension of the spatial frequency spectrum of the image is transferred into relatively narrow symmetrical two dimensional spectrum prior to transmitting the same through an optical system and then reconverting the image so that the two dimensional spectrum is transferred into a relatively wide one dimensional spectrum.

Yet another object of the present invention is to provide an improved means of modulating an image so that it can be transmitted through a relatively low grade optical system without deterioration.

The present invention achieves the foregoing objects by modulating each image prior to transmitting it through the system and then demodulating the same at the output of the system. The modulation is accomplished by a stationary periodic structure which has an axis of periodicity angularly displaced from the axis of the object. This modulation produces sum and difference spatial frequencies some of which are transmitted through the optical system. At the output of the system the signals are demodulated by passing them through a second periodic structure which has an axis of periodicity parallel to the axis of periodicity of the first periodic structure. The resulting image has superimposed thereon noise patterns whose axes are displaced from the axis of periodicity of said object. An improved image can be obtained by optically smearing the image in a direction perpendicular to its axis.

The foregoing and other objects, features and advantages of the invention will be apparent from the following more particular description of preferred embodiments of the invention, as illustrated in the accompanying drawings.

Figures 3, 3A, 3B, 3C, 4, 4A, 4B, 4C, 4D:
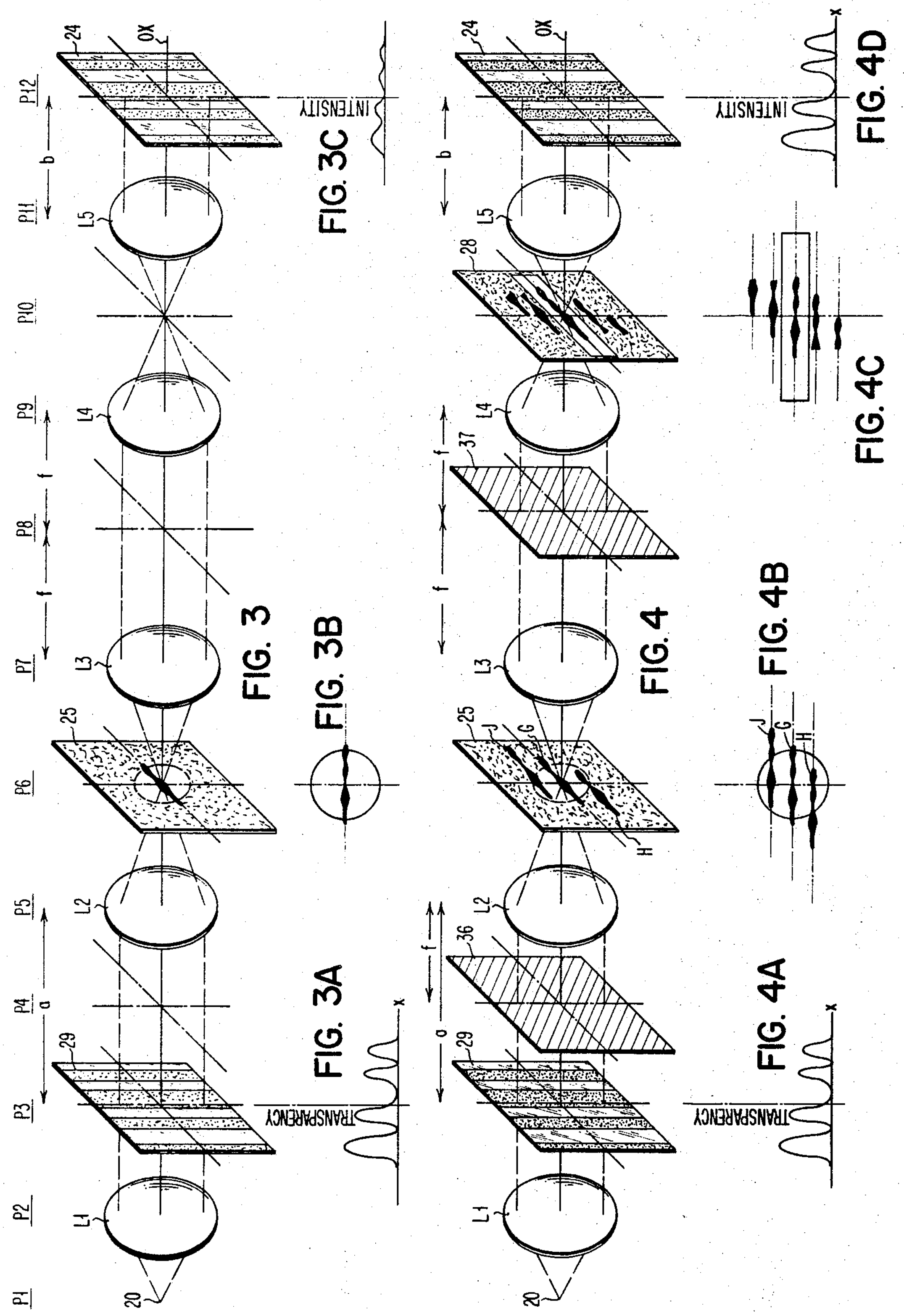
FIGURE 3 is a diagram showing how an aperture stop prevents an optical system from transmitting high frequencies.

FIGURES 3A, 3B, and 3C explain the operation of the system shown in FIGURE 3.

FIGURE 4 is a second embodiment of the present invention.

FIGURES 4A, 4B, 4C and 4D explain the operation of the system shown in FIGURE 4.

Before giving a description of the present invention, the problem which the present invention overcomes will be explained with reference to the optical system shown in FIGURE 1. The optical system shown in FIGURE 1 has a plurality of elements positioned along an optical axis OX. To facilitate the following explanation twelve planes which are perpendicular to the optical axis are identified in the figure by the designation P1 to P12. A very small (approximating a point source) light source 20 is positioned in plane P1. For simplicity in explanation, light source 20 is monochromatic. An object 21 is positioned in plane P3, five lenses L1 to L5 are positioned along the optical axis OX in planes P2, P5, P7, P9 and P11, a screen 24 is positioned in plane P12 and a mask or "stop" 25 is positioned in plane P6. Mask 25 is opaque except for a center portion that is transparent. For simplicity, the object 21 is a simple diffraction grating. The diffraction grating 21 has a horizontal axis of periodicity. That is, the opaque lines in object 21 are perpendicular to a horizontal axis which is defined as the axis of periodicity. Each of the lenses L1 to L5 has an equal focal length. The distance (a) between planes P1 and P2; (b) between planes P5 and P6; (c) between planes P6 and P7; (d) between planes P9 and P10 and (e) between planes P10 and P11 are all equal to the focal length of the lenses. The distances between the other planes is arranged so that an image of object 21 appears on screen 24. Specifically the distances between planes P3 and P5 (designated $a$); between planes P7 and P9 (designated $2f$) and between planes P11 and P12 (designated $b$) is such that: $a+b=2f$. The spacing of elements on the various drawings are merely illustrative of actual distances and for convenience in illustration the elements are not spaced on the drawings in exact accordance with the above defined distances.

The hole in mask 25 defines the system's "aperture stop." Mask 25 also prevents vignetting since the diameter of the aperture is less than the diameter of the lens L2. In many optical systems a separate element is not included which explicitly defines the aperture stop. In such systems the aperture stop is defined by the characteristics of the other elements in the system such as by the outer rim of the various lenses. Herein, for simplicity, a separate and distinct element 25 which defines the aperture stop is included. Such an element however is not in any way needed for the operation of the invention. Lenses L2 and L3 and mask 25 form a simple optical system which is herein used to explain the present invention; however, the present invention is useful in any optical system irrespective of the degree of complexity of the system.

Figure 1:
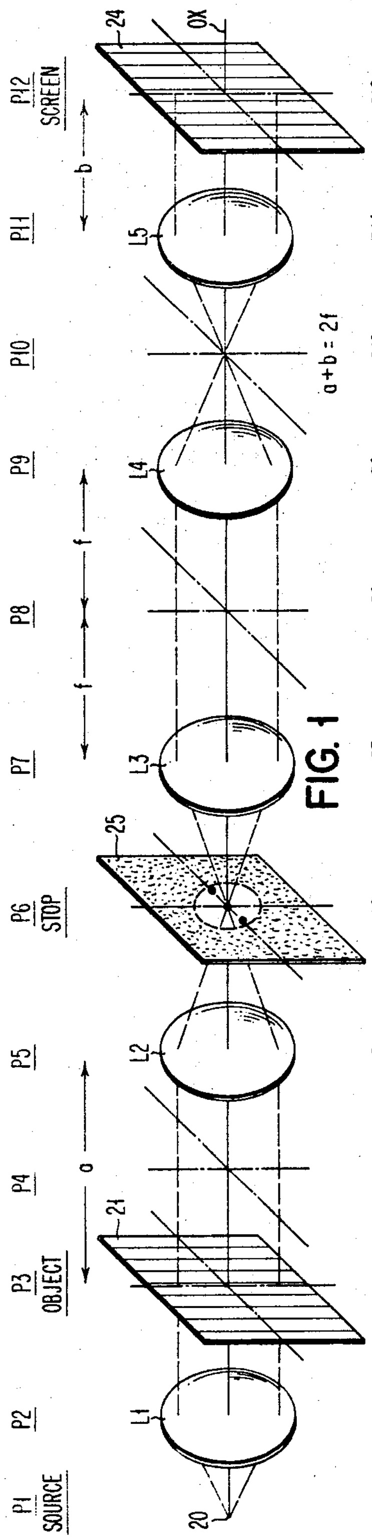
FIGURE 1 is a diagram of an optical system which is used to explain the transmission limitations inherent in any optical system.

With the system shown in FIGURE 1, an image of the object 21 is formed on the screen 24 in plane P12. A diffraction pattern appears in plane P6. Due to simplicity of the object 21, the diffraction pattern in plane P6 consists of a series of dots. The diffraction grating 21 is so constructed that the first order diffraction predominates; hence, three dots appear in plane P6. The three dots appear along a horizontal line. The direction of the line along which the three dots appear is parallel to the axis of periodicity of the object 21. The distance between the dots in plane P6 is dependent upon the spatial frequency (i.e. the spacing of the opaque lines) in object 21. If the grating has a high spatial frequency (i.e. if the opaque lines are spaced close together) the dots in plane P6 are spread further apart and if the grating has a low spatial frequency the dots are close together. The aperture in mask 24 has a particular diameter; hence, if the frequency of grating 21 is too high the dots in plane P6 due to first order diffraction fall outside of the aperture and no information bearing light is transmitted past plane P6 to the screen 24. The light in the zero order of diffraction pattern is transmitted but this light does not carry any significant information. The frequency of object 21 for which the dots caused by the first order diffraction in plane P6 are separated from the axis by a distance which exceeds the diameter of the aperture in plane P6 can be defined as the upper cutoff frequency for the system shown. The present invention provides a technique for transmitting through a system spatial frequencies which are above the system's upper cutoff of frequency.

Figure 2:
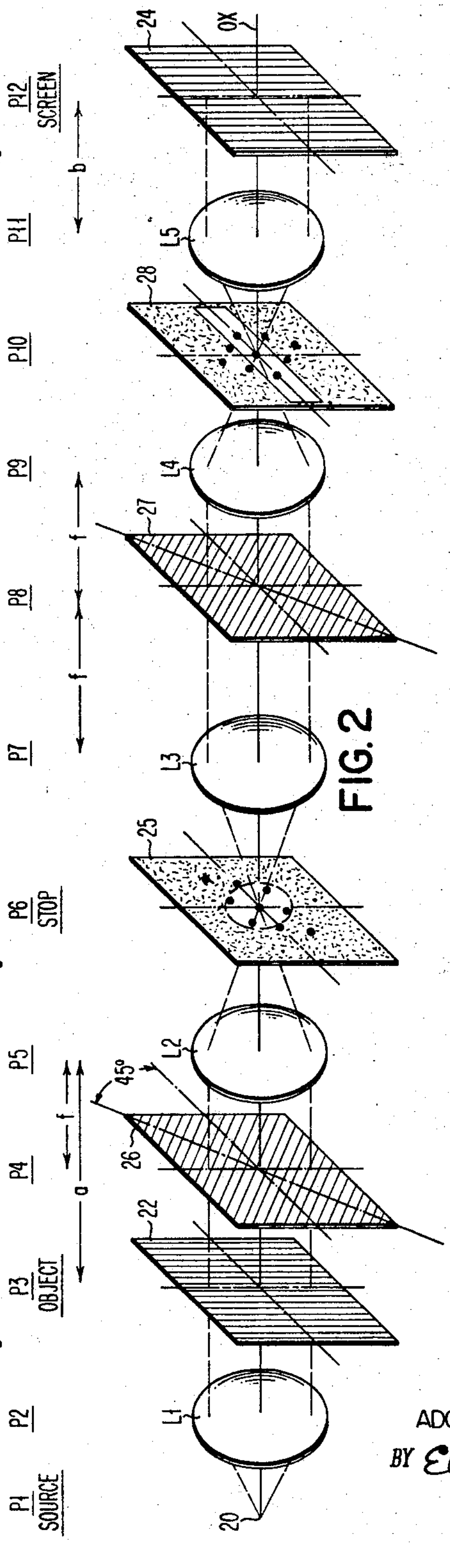
FIGURE 2 is a simplified embodiment of the present invention.

A first simplified embodiment of the present invention is shown in FIGURE 2. The optical system shown in FIGURE 2 is in many respects similar to the system shown in FIGURE 1. However, the system shown in FIGURE 2 has a number of additional elements which allow the system to transmit a wider band of spatial frequencies than does the system shown in FIGURE 1 without changing the size of the aperture stop in plane P6. The additional elements which increase the aperture stop of the system shown in FIGURE 2 consist of a diffraction grating 26 in plane P4 and a diffraction grating 27 in plane P8. The diffraction gratings 26 and 27 have an axis of periodicity which is angularly displaced by forty-five degrees from the axis of periodicity of the object 21 in plane P3. The distance between planes P4 and P5 and between planes P7 and P8 is equal to the focal length of the lenses (designated *f*) whereby an image of element 26 is formed on element 27. For simplicity, all of the diffraction gratings shown herein are of the type wherein first order diffraction predominates. Such gratings are commercially available. As will be explained in detail, the addition of diffraction gratings 26 and 27 allow the system to pass a wider band of spatial frequencies than would be possible if these elements were not provided.

The embodiment shown in FIGURE 2 also has an additional mask 28 positioned in plane P10. The mask in plane P10 is opaque except for a relatively narrow horizontal slit which is transparent. As will be explained in detail later, this mask is used to smear the object in a direction perpendicular to the axis of periodicity.

Figures 2A, 2B:
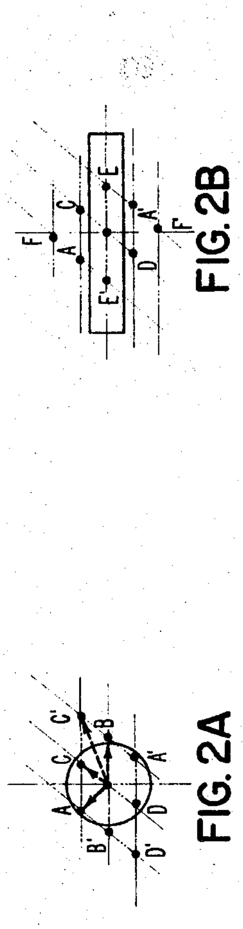
FIGURES 2A and 2B are diagrams illustrating conditions at various planes in the embodiment shown in FIGURE 2.

For clarity, a plainer view of the diffraction pattern appearing in plane P6 is shown in FIGURE 2A and a plainer view of the diffraction pattern appearing in plane P10 is shown in FIGURE 2B. Objects 22 and 26 produce a diffraction pattern in plane P6 which consists of all of the following:

(a) The diffraction pattern which would be generated by object 22 alone;

(b) The diffraction pattern which would be generated by object 26 alone;

(c) The diffraction pattern which would be generated by an object having spatial frequencies equal to the vector sum of the spatial frequencies in objects 22 and 26;

(d) The diffraction pattern which would be generated by an object having a spatial frequency equal to the vector difference between the spatial frequencies of objects 22 and 26.

The dots which comprise each of the above patterns are shown in FIGURE 2A. Dots B and B′ are the diffraction pattern which would be formed by object 22 alone. It is noted that these dots are outside of the aperture in mask 25. Dots C and D are the diffraction pattern which would be formed by mask 26 alone. Dots A, A′, C′ and D′ represent the vector sum and difference frequencies. C′ is the vector sum of B and C, A is the vector sum of C and B′, D′ is the vector sum of D and B′ and A′ is the vector sum of D and B. The vector summation of frequencies B and C to produce dot C′ is illustrated in FIGURE 2A by the heavy dotted arrows (i.e. vectors) to dots B, C and C′. The frequencies A, A′, C and D′ could have alternately been explained as difference frequencies. For example, A is the vector difference C minus B.

The important point which should be noted is that the dots designated C, D, A and A′ are within the aperture in mask 25. The light passing through dots A, A′, C and D (all of which are within the aperture) carries all of the information necessary to recreate an image of the object 21 as will be explained. The frequency and orientation of mask 26 must be chosen so that the resulting summation frequencies that carry the image information (i.e. frequencies A and A′) are within the aperture stop of the system. A specific example of the orientation and frequency of the mask and the improvement thereby achieved is given later.

The diffraction pattern which appears in plane P10 is the summation of the frequencies passing through plane P6 plus the spatial frequencies introduced by mask 27. The frequencies introduced by mask 27 consist of the frequency of mask 27 plus the vector sum of this frequency with each of the other frequencies in the light. Thus, in plane P10 dots corresponding to dots A and A′, C and D appear since these frequencies are in the light which passes through plane P6. Dots corresponding to dots B, B′, D′ and C′ do not appear since the light which carried the spatial frequencies which formed these dots was not allowed to pass through plane P6. In addition to dots corresponding to dots A, A′, C and D, other dots appear in plane P10 which are caused by the spatial frequency of grating 27 itself and the vector sum and difference between the frequency of grating 27 and frequencies corresponding to dots A, A′, C and D.

Since the frequency and orientation of diffraction grating 27 is identical to the frequency and orientation of diffraction grating 26, the dots representing the spatial frequencies introduced by diffraction grating 27 itself are superimposed upon the dots C and D. The following four additional dots which are caused by the vector sum and difference frequencies also appear in plane P10.

(a) The dot E′ which is caused by the spatial frequency which is the vector sum of the spatial frequencies that cause dots A and D.

(b) The dot E which is caused by the spatial frequency which is the vector sum of the spatial frequencies that cause dots A′ and C.

(c) The dot F′ which is caused by the spatial frequency which is the vector sum of the spatial frequencies that cause dots A′ and D.

(d) The dot F which is caused by the spatial frequency which is the vector sum of the spatial frequencies that cause dots A and C.

Mask 28 prevents all light except that in points E and E′ from passing through plane P10. It is noted that points E and E' are positioned identically to points B and B' in plane P6. Thus, the image which appears on screen 24 is an exact image of object 21.

The embodiment of the invention shown in FIGURE 2 is a simplified embodiment. The simplifications include the fact that the light source 20 is a monochromatic point source whereby the object 21 is illuminated with coherent parallel light. Furthermore, object 21 is a very simple object merely consisting of a diffraction grating. Later, the explanation of the invention will be extended to include objects which have any arbitrary variation in transparency. (However, only the variation in transparency in one dimensional is transmitted through the system). Furthermore, the explanation will later be extended to include systems which illuminate the object with incoherent polychromatic light.

FIGURE 3 shows an optical system being used to transmit an image of a relatively complex object 29 from plane P3 to plane P12. This figure illustrates why the aperture stop in the system prevents the system from transmitting an accurate image of the object. The system includes the same lenses as in the previously described system and it also includes the same aperture stop 25 in plane P6. Object 29 only has variations in transparency in the $x$ direction. The variations in transparency in the $x$ direction of object 29 are shown in FIGURE 3A wherein the transparency of object 29 is plotted relative to the $x$ axis. The axis along which the transparency of object 29 varies (i.e. the $x$ axis) is herein termed the axis of periodicity of object 29.

Object 29 creates a diffraction pattern in plane P6. Since object 29 includes a continuum of spatial frequencies, a bar of light rather than a plurality of dots appear in plane P6. The intensity of this bar varies along its length depending upon the particular spatial frequencies in object 29. The variations shown in FIGURE 3 are merely meant to be illustrative and they are not meant to be an accurate portrayal of the Fraunhofer pattern created by an object which has the transparency variation shown in FIGURE 3A. The exact pattern created by any object is defined by the Fourier transform of the transparency of the object.

Due to the presence of mask 25, only a portion of the diffraction pattern is transmitted through plane P6. Mask 25 prevents the end portions (which carry high frequency information) from passing plane P6. Thus, the image formed in plane P12 is not an accurate image of object 29. FIGURE 3C shows the intensity of the image relative to distance along the $x$ axis. FIGURE 3C is meant to illustrate a degradation of an image due to the elimination of high spatial frequencies. This occurs in any optical system wherein one attempts to transmit an image through the system which includes spatial frequencies above the cutoff limit of the system. As was previously explained, the purpose of the present invention is to make it possible to transmit higher spatial frequencies through an optical system.

FIGURE 4 shows a second embodiment of the present invention wherein appropriate modulating and demodulating elements are inserted in the system so that an accurate image of object 29 is transmitted to plane P12 without increasing the aperture stop of the system. The second embodiment of the invention includes two diffraction gratings 36 and 37 positioned in planes P4 and P8. The axes of periodicity of diffraction gratings 36 and 38 are parallel and they are angularly displaced from the axis of periodicity of object 29. As in the first embodiment of the invention, a slit mask is also positioned in plane P10 to prevent certain undesirable signals from reaching plane P12. FIGURE 4A shows the transparency of object 29 with respect to the $x$ axis and FIGURE 4C shows the intensity of the image on plane P12 with respect to the $x$ axis. Due to the inclusion of diffraction gratings 36 and 38, FIGURE 4D is substantially identical to FIGURE 4A; thus, indicating that an accurate image of object 29 appears in plane P12.

The reason that the system shown in FIGURE 4 can transmit an image which has frequencies above the normal cutoff frequency of the system can be seen by reference to FIGURES 4B and 4C. FIGURE 4B shows the diffraction pattern which is formed in plane P6 due to the inclusion of mask 36. As with the first embodiment of the invention, diffraction grating 36 is constructed so that first order diffraction predominates. Thus, for each point of light in the diffraction pattern shown in FIGURE 3B, there are three points of light in the diffraction pattern shown in FIGURE 4B. Since the actual diffraction pattern consists of a continuum of dots the total diffraction pattern, due to the presence of masks 36, consists of three continua of dots. An important point however is that the three continua are displaced relative to each other in the $x$ direction. Thus, although the relatively small aperture in mask 25 prevents the end portions of the pattern designated G from passing through plane P6. The right end of the pattern designated H falls within the aperture and passes through plane P6 since the pattern designated H is displaced to the left. Similarly, the pattern designated J is displaced to the right; hence, the left end of this pattern falls within the aperture and passes through plane P6. The end portions of the patterns J and H are similar to the dots A and A' shown in FIGURE 2A. Those portions of the diffraction pattern which pass through plane P6 contain all of the information necessary to reconstruct an accurate image of object 29. However, this information is in a modulated form due to the presence of diffraction grating 36. The information is demodulated through the action of diffraction grating 38 as in the first embodiment of the invention. Due to the presence of diffraction grating 37, the pattern which appears in plane P10 includes all the spatial frequencies which pass plane P6 plus the spatial frequencies introduced by mask 37 plus the vector sum and differences of these frequencies. This is shown in FIGURE 4C which is similar to FIGURE 2B for the first embodiment of the invention. Note that in FIGURE 2B if one considers the dots on various horizontal lines, the center line has three dots, the horizontal lines above and below the center line have two dots and the top and bottom line have one dot. The reason for the presence of each of these dots was previously explained. Similarly, in FIGURE 4C the center line has the complete pattern (similar to three dots in FIGURE 2B), the horizontal lines above and below the center line have two thirds of the complete pattern (similar to two dots in FIGURE 2B) and the top and bottom lines only have one third of the pattern (similar to one dot in FIGURE 2B).

Mask 28 only allows selected portions of the diffraction pattern to pass plane P10 thereby forming an accurate image of object 29 on screen 24. The frequencies eliminated by mask 28 are all frequencies which have a component in a direction other than the $x$ direction. These additional components are introduced due to the presence of masks 36 and 37.

Mask 28 is merely one technique for eliminating those spatial frequencies which have components in directions other than $x$. Other smearing techniques such as a cylindrical lens or a photographic film which is moved perpendicular to the $x$ direction could be utilized. As shown herein, the periodic structures which modulate and demodulate the light carrying images are diffraction gratings. However, it should be appreciated that other types of periodic structures could be utilized.

As previously indicated, the present invention can also be used in noncoherent optical systems or in systems wherein the light source is extended rather than a point source as shown herein. Where the illumination is from an extended light source, certain problems can be eliminated by arranging the distances and focal lengths such that the modulating periodic structure and the original object (or image thereof) are positioned in substantially the same plane.

The improvement possible with the present invention can be seen from the following numerical example. The following example shows the improvement possible in an optical system having a stop of 4 and wherein the object is illuminated with incoherent light having a wave length of 0.5 microns (green). By inserting masks similar to masks 26 and 27 which have an orientation of thirty degrees and a frequency of 350 lines per millimeter the resolution of the system is increased from 500 lines per millimeter to 750 lines per millimeter. Furthermore, for the spatial frequencies below 500 lines per millimeter, the contrast achieved with the present invention is superior to the contrast achieved without the present invention.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A system including:

a one dimensional object, said object having an axis, all variations in said object having a gradient parallel to said axis, an optical system for transmitting an image of said object, said optical system having a passband such that only frequencies below an upper cut off frequency are passed through said system, said optical system having an optical axis, said object having spatial frequencies which are above said upper cut off frequency of said optical system, modulating means positioned to intercept light entering said optical system, said modulating means comprising a stationary first periodic line structure which has an axis of periodicity displaced from the optical axis and displaced from the axis of said object, said first periodic line structure being positioned adjacent to said object whereby an image of said object is projected onto said first periodic line structure, demodulating means positioned to receive the light passing through said optical system, said demodulating means comprising a stationary second periodic line structure which has a frequency and orientation which is substantially the same as the image of said first periodic structure as tranmitted by said optical system, said optical system creating an image of said first periodic line structure on said second periodic line structure, a lens for collecting the light passing through said second periodic line structure, means positioned in the focal plane of said lens for filtering out variations in a direction perpendicular to said axis of said object, whereby said system transmits through said optical system information having spatial frequencies above the upper cut off frequency of said optical system.

2. The combination recited in claim 1 wherein said first periodic structure comprises a diffraction grating.

3. The combination recited in claim 1 wherein said first and second periodic structures comprise diffraction gratings.

References Cited

UNITED STATES PATENTS 3,191,487 6/1965 Kruythoff et al. ______ 350—168

OTHER REFERENCES

Cutrona et al.: Proceedings of the National Electronics Conference, vol. 15, pp. 262–275, 1959 (copy in 350/162).

DAVID SCHONBERG, *Primary Examiner.*

RONALD J. STERN, *Assistant Examiner.*

U.S. Cl. X.R.

88—1